Figure 1:
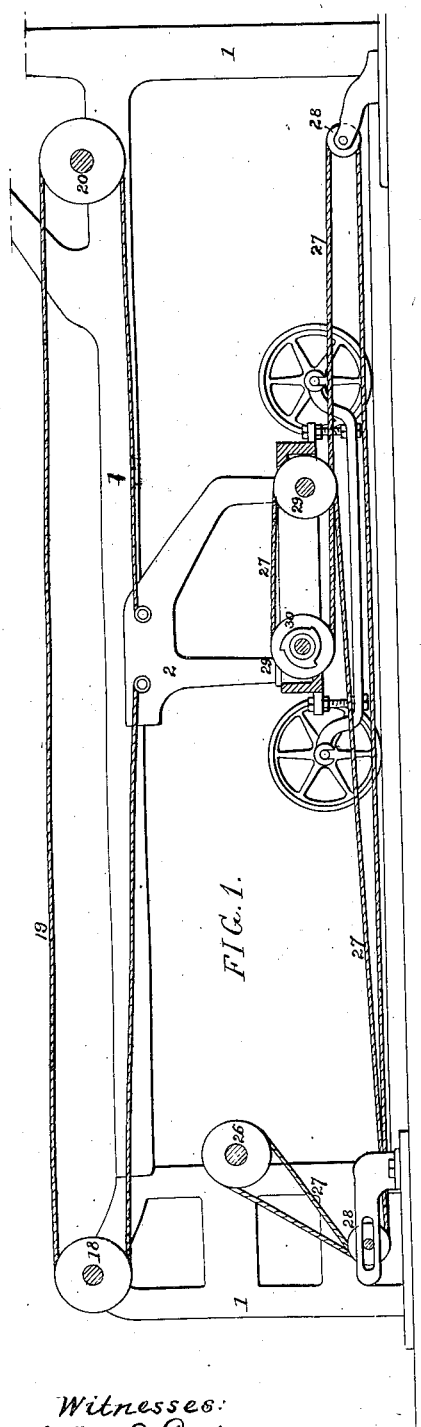

(No Model.) 13 Sheets—Sheet 1.

B. F. MEYER.
SELF ACTING SPINNING MULE.

No. 544,234. Patented Aug. 6, 1895.

Witnesses:
John E. Parker
William F. Davis

Inventor
Benjamin F. Meyer
by his Attorneys
Howson and Sons (No Model.) 13 Sheets—Sheet 2.
B. F. MEYER.
SELF ACTING SPINNING MULE.

No. 544,234. Patented Aug. 6, 1895.

FIG. 3.

Witnesses:
John E. Parker
William F. Davis

Inventor:
Benj. F. Meyer
by his Attorneys
Howson and Sons (No Model.) 13 Sheets—Sheet 3.

B. F. MEYER.
SELF ACTING SPINNING MULE.

No. 544,234. Patented Aug. 6, 1895.

(No Model.) 13 Sheets—Sheet 4.

B. F. MEYER.
SELF ACTING SPINNING MULE.

No. 544,234. Patented Aug. 6, 1895.

Witnesses:
William F. Davis
John E. Parker

Inventor:
Benjamin F. Meyer
by his Attorneys
Howson and Sons (No Model.)

13 Sheets—Sheet 8.

B. F. MEYER.
SELF ACTING SPINNING MULE.

No. 544,234.

Patented Aug. 6, 1895.

FIG. 9.

Witnesses:
John E. Parker
William F Davis

Inventor:
Benjamin F. Meyer
by his Attorneys
Howson and Sons (No Model.) 13 Sheets—Sheet 9.

B. F. MEYER.
SELF ACTING SPINNING MULE.

No. 544,234. Patented Aug. 6, 1895.

Witnesses
John E. Parker
William F. Davis

Inventor
Benj. F. Meyer
by his Attorneys:

(No Model.)

B. F. MEYER.
SELF ACTING SPINNING MULE.

No. 544,234.

13 Sheets—Sheet 10.

Patented Aug. 6, 1895.

(No Model.)  B. F. MEYER.  13 Sheets—Sheet 11.
SELF ACTING SPINNING MULE.

No. 544,234. Patented Aug. 6, 1895.

Witnesses:
John E. Parker
William F Davis

Inventor:
Benjamin F. Meyer
by his Attorneys
Howson and Sons

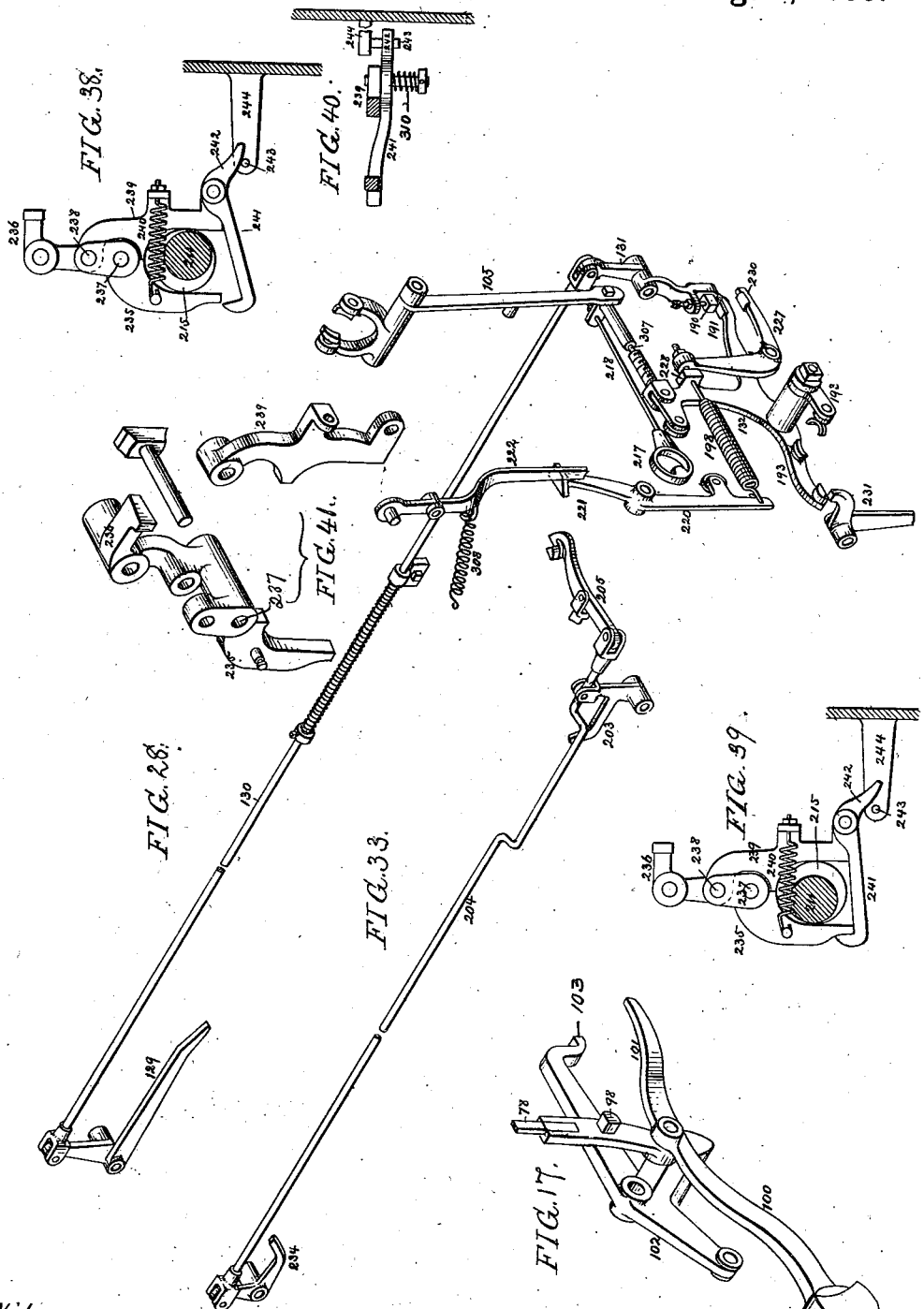

(No Model.) 13 Sheets—Sheet 13.
B. F. MEYER.
SELF ACTING SPINNING MULE.
No. 544,234. Patented Aug. 6, 1895.
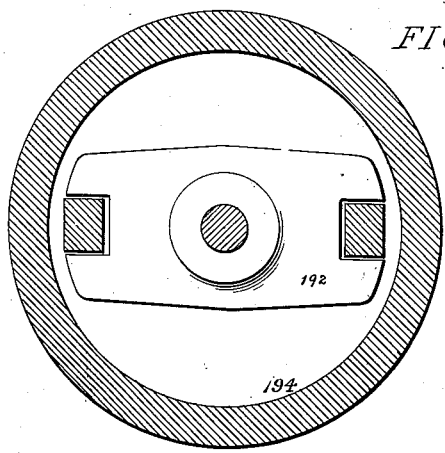
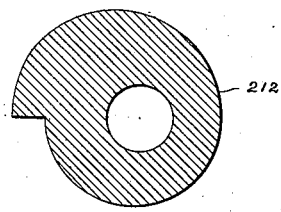
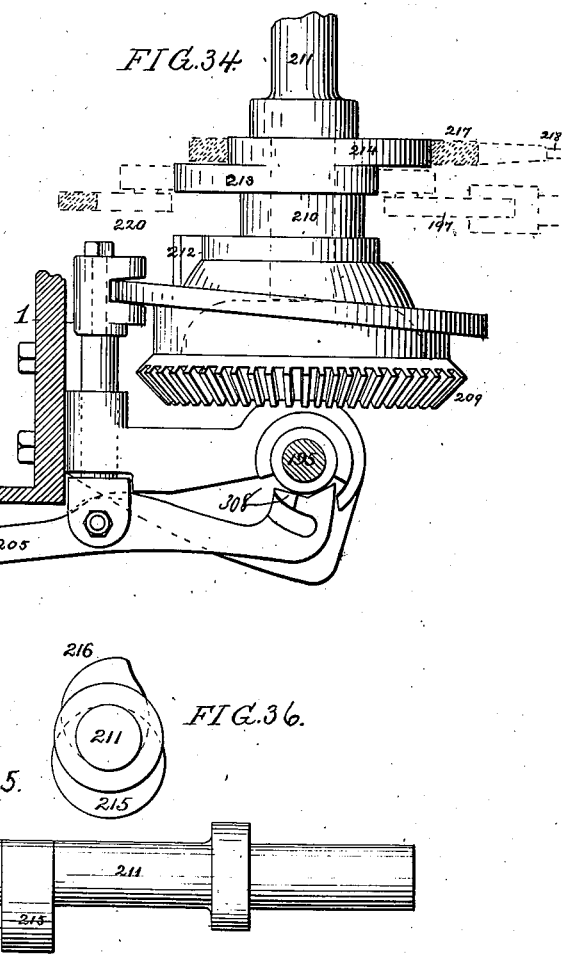
Witnesses
John E. Parker
William F. Davis
Inventor:
Benjamin F. Meyer
by his Attorneys:
Howson and Sons

UNITED STATES PATENT OFFICE.

BENJAMIN F. MEYER, OF CAMDEN, NEW JERSEY, ASSIGNOR TO THE M. A. FURBUSH & SON MACHINE COMPANY, OF NEW JERSEY.

SELF-ACTING SPINNING-MULE.

SPECIFICATION forming part of Letters Patent No. 544,234, dated August 6, 1895.

Application filed November 2, 1885. Serial No. 181,623. (No model.)

*To all whom it may concern:*

Be it known that I, BENJAMIN F. MEYER, a citizen of the United States, residing in Camden, New Jersey, have invented certain Improvements in Self-Acting Spinning-Mules, of which the following is a specification.

The objects of my invention are, first, to provide for the automatic stoppage of the quadrant-screw when the nut thereon has reached its proper position; second, to so operate the screw-shaft controlling the cam for the builder-rail as to provide for differential movement of said cam; third, to provide for the proper taking up and adjustment of the backing-off chain; fourth, to render more effective than usual the mechanism for throwing into or out of action the winding-gear on the carriage; fifth, to insure a rigid and secure connection of the central portion of the cylinder-shaft to the cylinders, and yet permit the ready application and removal of the central portion of the cylinder-shaft; sixth, to regulate the movement of the shifter, whereby the driving-belt is transferred from one pulley to another of the driving-gear on the head of the mule; seventh, to lessen the strain upon the friction device which drives the cam-shaft; eighth, to so construct the device for operating the draft-clutch as to prevent the latter from accidentally slipping out of gear, and, ninth, to prevent the breaking of portions of the gearing which controls the rotation of the feed-rolls for the slubbing or roving.

Figure 2:
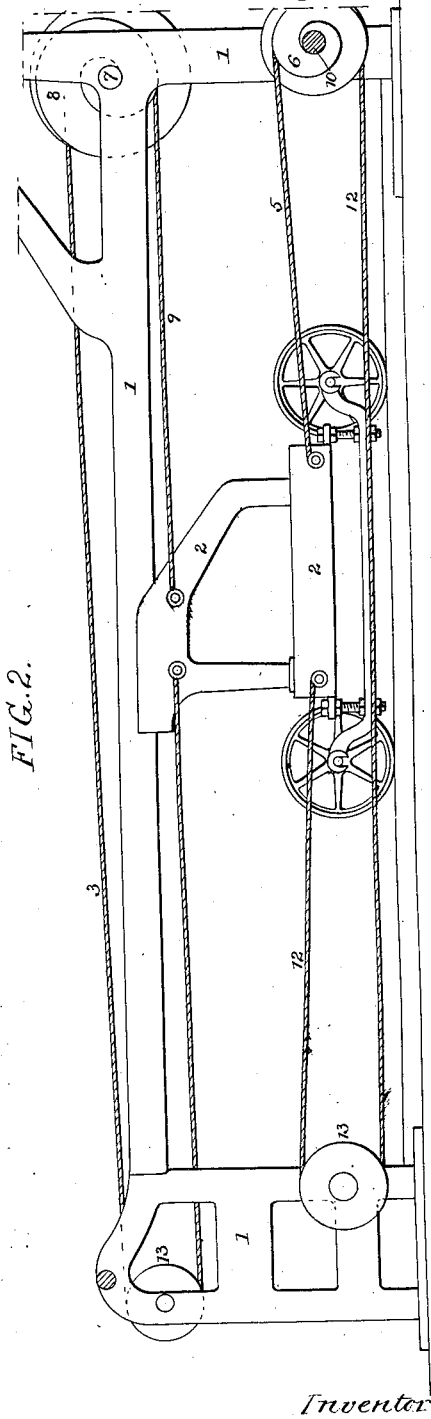
Figure 4:
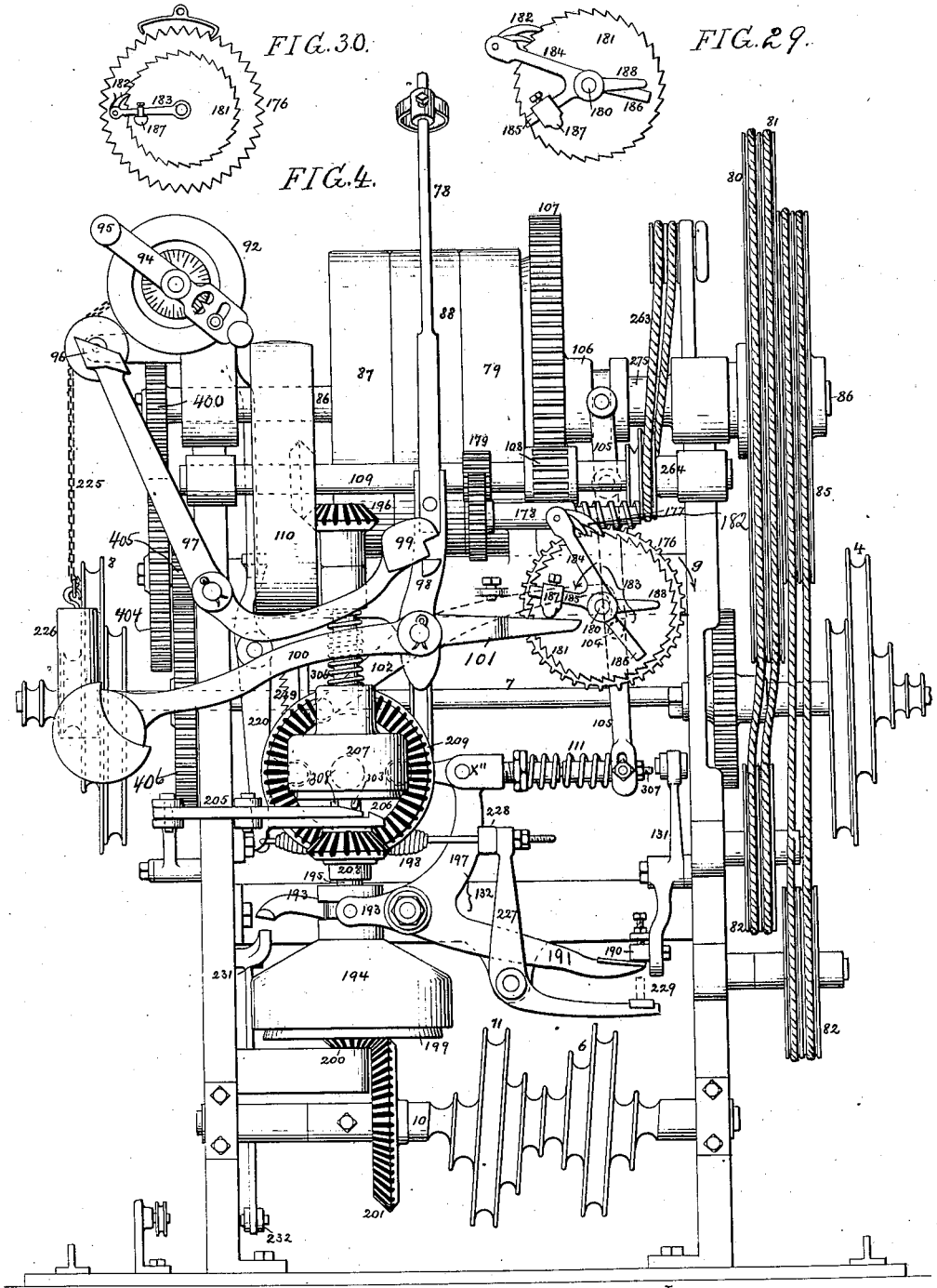
Figure 5:
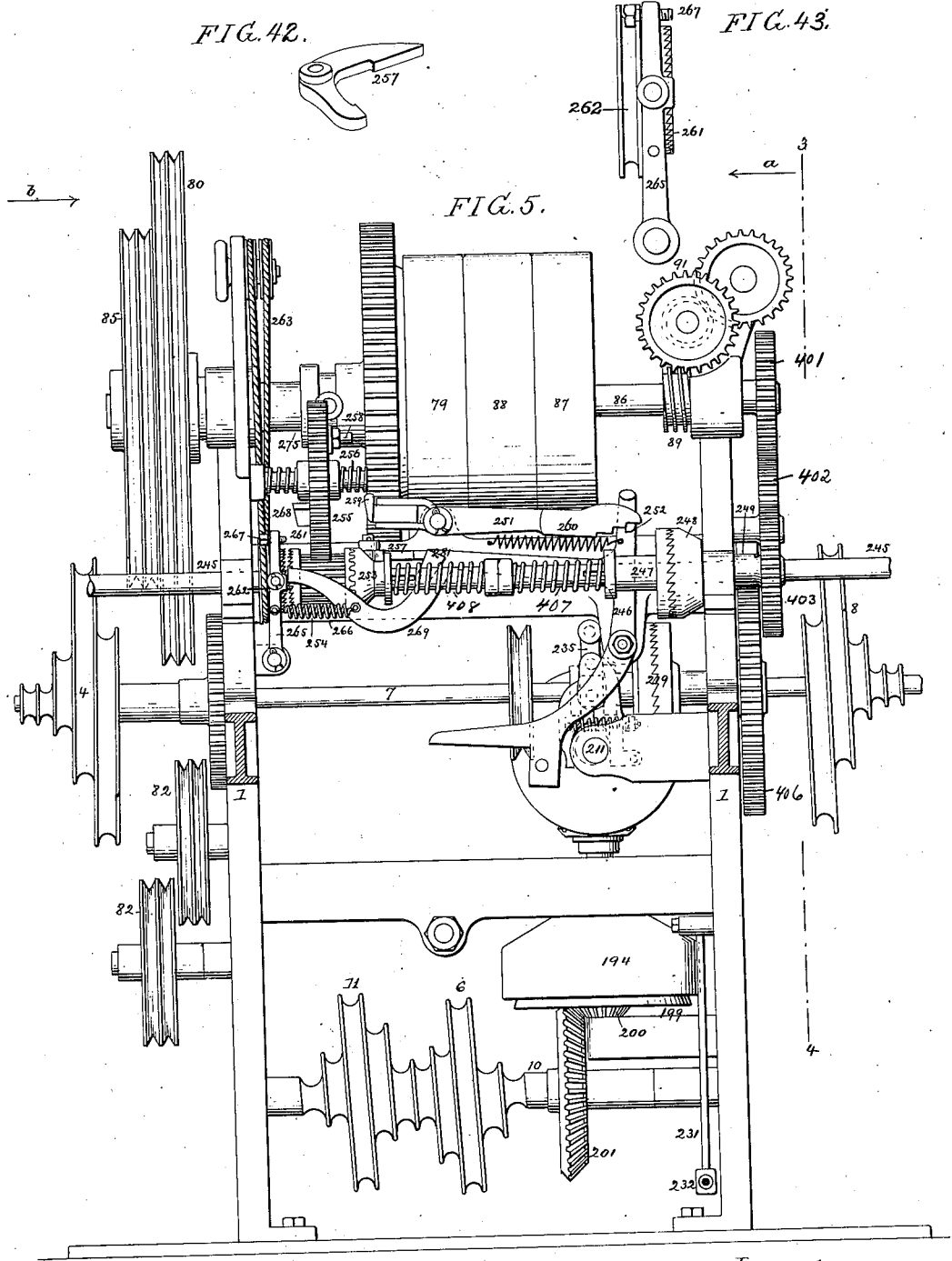
Figure 6:
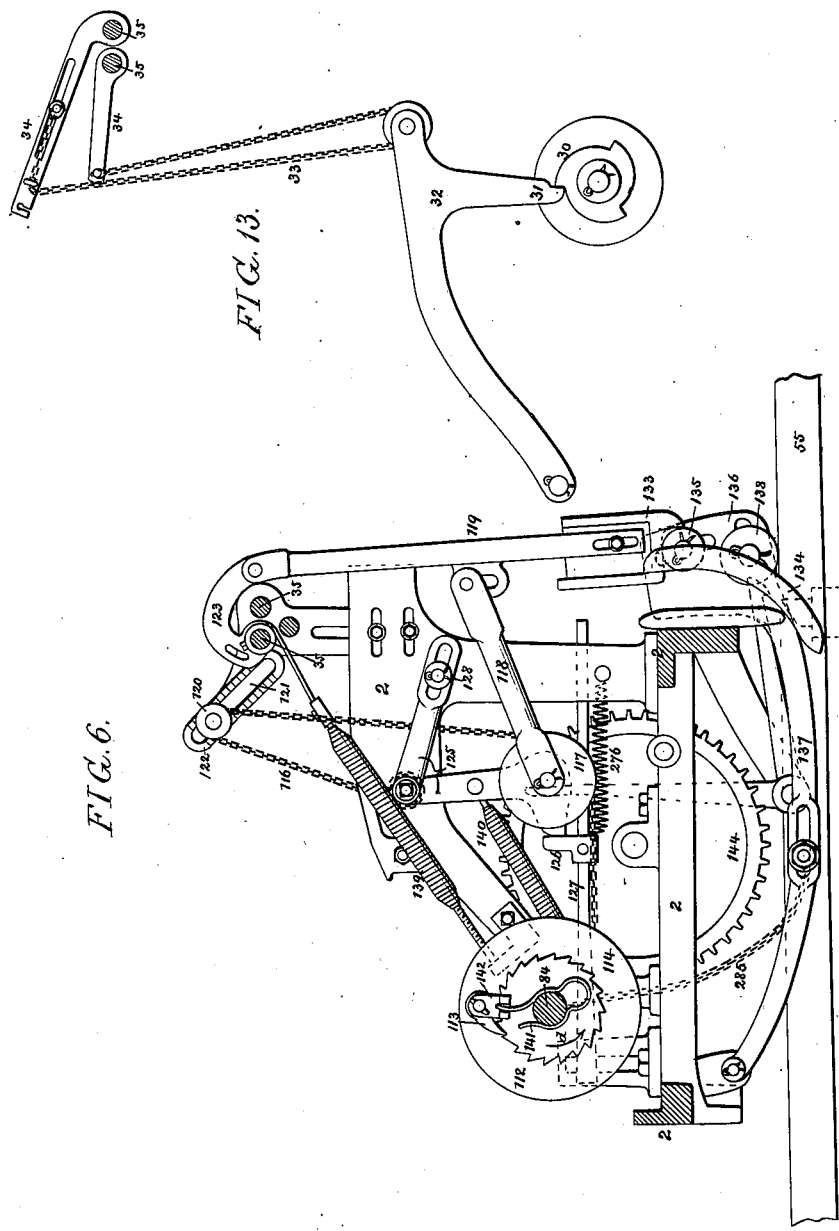
Figure 7:
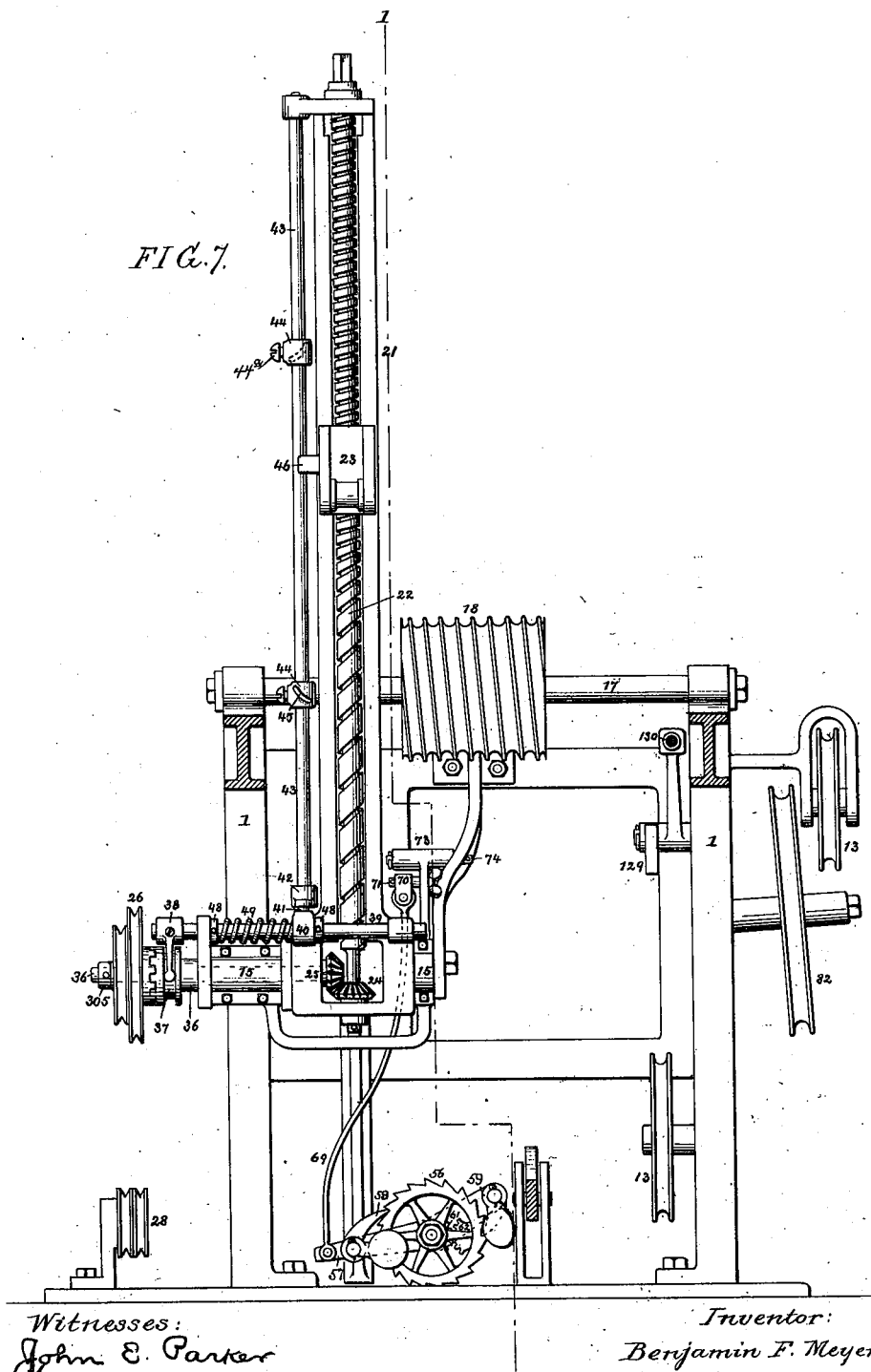
Figure 8:
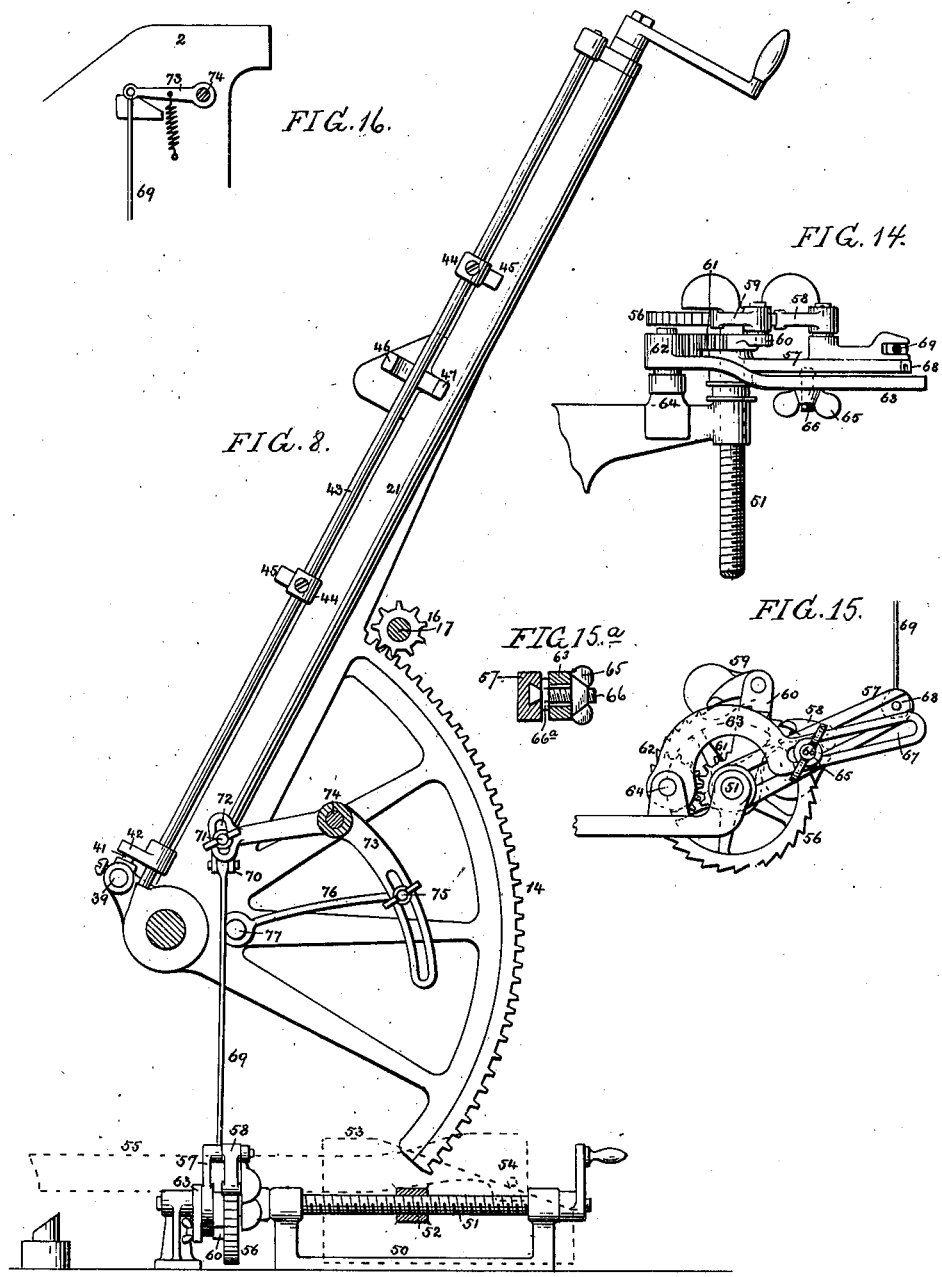
Figure 10:
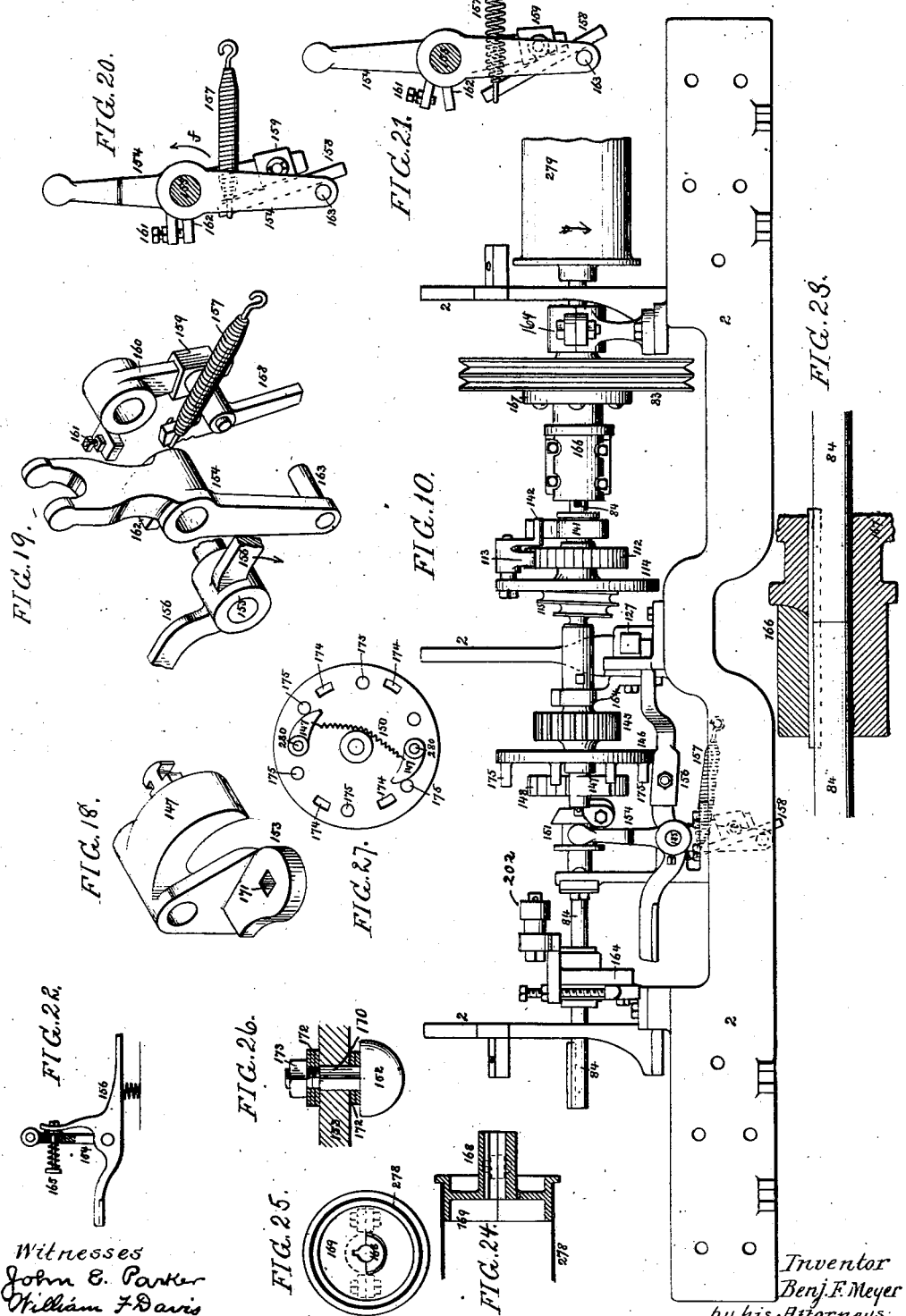
Figure 11:
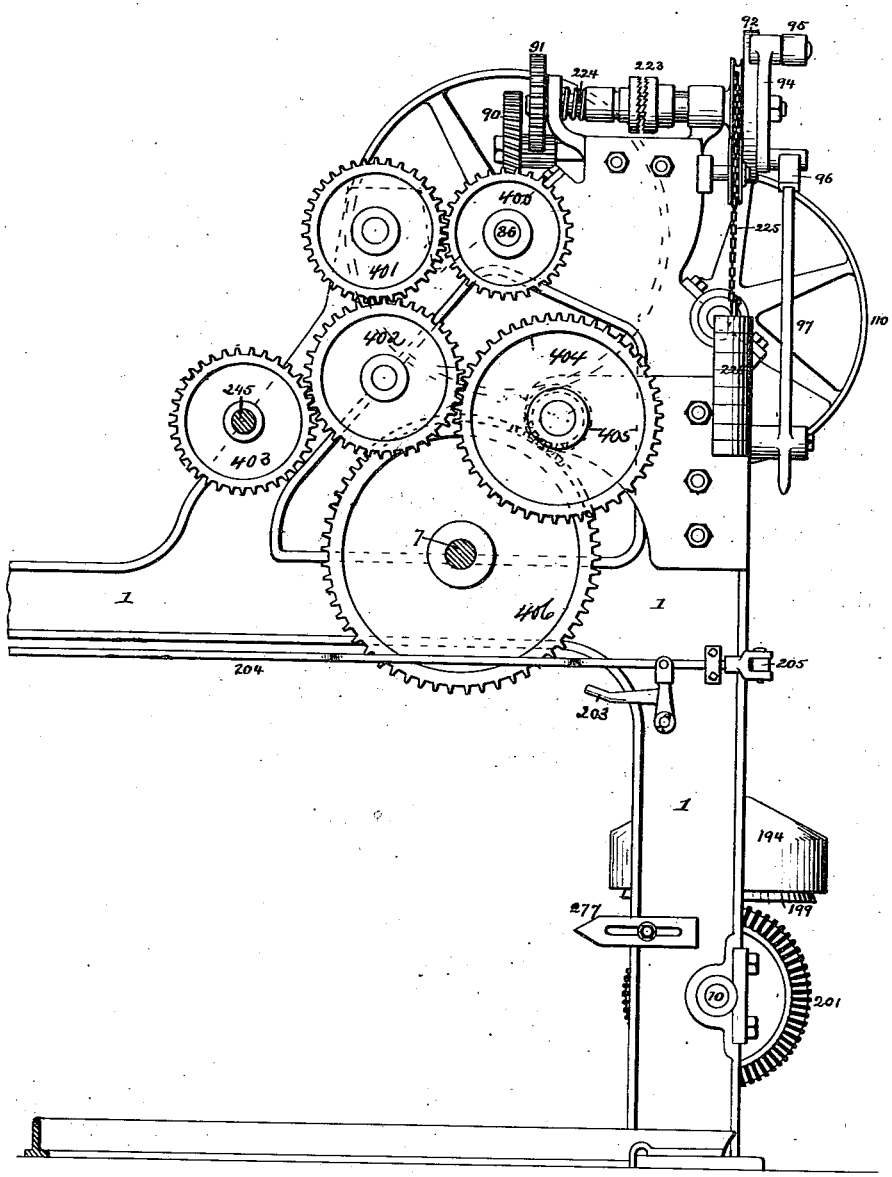
Figure 12:
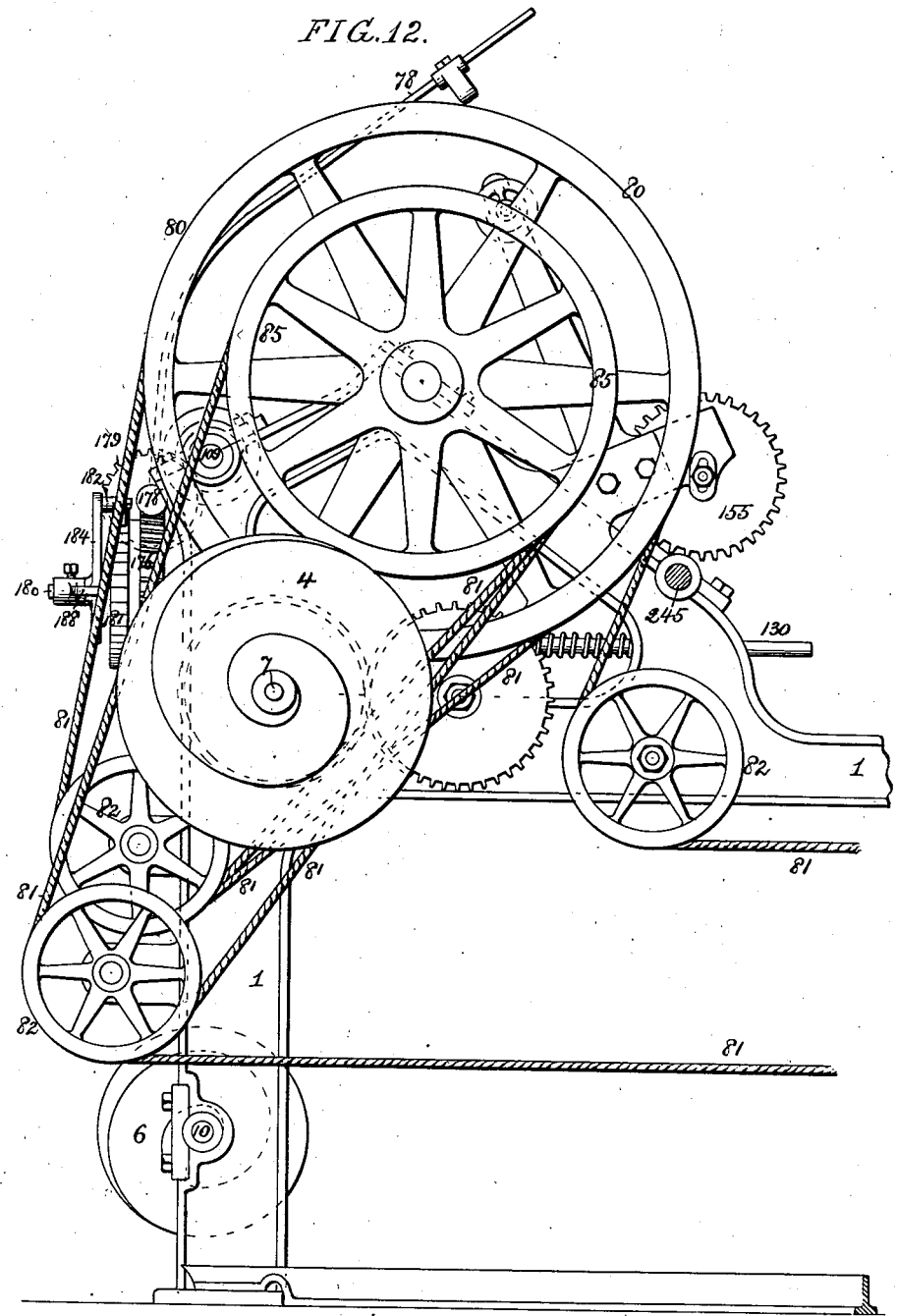

In the accompanying drawings, Figure 1 is a transverse section of part of the frame of a mule and its carriage, showing the bands for operating the gearing for vibrating the quadrant and the bands for actuating the screw of the same; Fig. 2, a similar view showing the bands for pulling the carriage in and out; Fig. 3, a view of a character somewhat similar to Figs. 1 and 2, but showing the quadrant, the builder-rail, part of the backing-off mechanism, and the bands and pulleys for driving the cylinder-shaft; Fig. 4, a rear view, on a larger scale, of the head of the machine; Fig. 5, a front view of the same with part of the fixed frame in section; Fig. 6, a sectional view through the central portion of the carriage, showing the backing-off chain and devices operating therewith; Fig. 7, a front view of the quadrant and some of the adjacent parts of the mule, showing the gearing for operating the quadrant-screw and the devices for operating the screw-shaft which controls the outer cam for the builder-rail; Fig. 8, a section on the line 1 2, Fig. 7; Fig. 9, a plan view of the winding-gear and backing-off mechanism on the carriage; Fig. 10, a face view of the same; Fig. 11, a section on the line 3 4, Fig. 5, looking in the direction of the arrow $a$ and omitting portions of the mechanism on the back of the head; Fig. 12, an end view of the head of the mule, looking in the direction of the arrow $b$, Fig. 5, and also omitting parts of the mechanism at the back of the head; and Figs. 13 to 43, inclusive, detached views illustrating the construction of various parts of the mule and showing features of my invention.

So far as the general construction and operation of the mule is concerned, it is similar to mules now in use, and known as "Platt" mules, for a general idea of the construction and operation of which I may refer to the work entitled *Technologie der Gespinnifasern*, H. Grothe, Berlin, 1875, volume 1, pages 658 to 662, inclusive, and the accompanying figures and plates. Hence, in describing my invention I will allude to the ordinary working parts of the mule in general terms and as briefly as possible, consistent with a proper understanding of those parts to which my invention relates.

1 represents the fixed portion of the mule-frame, and 2 the frame of the carriage, the latter having wheels mounted upon suitable rails on the floor and being traversed in the usual manner by the pulling-out band 3, connected to a draft or pulling-out scroll 4, and by a pulling-in band 5, connected to a pulling-in scroll 6, the shaft 7 of the pulling-out scroll having a check-scroll 8 with a check-band 9, and the shaft 10 of the pulling-in scroll having a check-scroll 11 with check-band 12, said pulling-out band and pulling-in check-band passing around carrier-pulleys 13 at the outer end of the frame 1.

The usual quadrant 14 has a hub adapted to bearings 15 on the frame of the mule, this quadrant having a rack adapted to a pinion 16, on a shaft 17, which carries a drum 18, a cord 19, connected at its opposite ends to the carriage, being passed around this drum and around a pulley 20, so that as the carriage moves in and out the quadrant will be vibrated. The quadrant has the usual projecting arm 21, with bearings for the quadrant-screw 22, to which is adapted a nut 23, carrying one end of a chain 149, the other end of which is connected to a drum forming part of the winding-gear, as described hereinafter.

The quadrant-screw has at the lower end a bevel-pinion 24, gearing into a pinion 25 on a shaft 36, which passes through the hub of the quadrant, and has at the outer end a double pulley 26, around which passes a belt 27, which also passes around pulleys 28 on the fixed frame, and around other pulleys 29 on the traveling carriage, one of these pulleys 29 having a ratchet-drum 30, with which is adapted to engage a toe 31 on a pivoted arm 32, Fig. 13, the outer end of said arm being supported by a chain 33, the ends of which are connected to arms 34 on the faller-shafts 35. When the arm 32 is lifted and the ratchet-drum free from the control of the same, the carriage moves in and out without imparting any movement to the pulley 26, the power necessary to turn the latter being greater than that necessary to cause the turning of the drums 29. When the arm 32 falls, however, so as to lock the drum 30, the pulley 29, connected to said drum, is prevented from rotating and the movement of the carriage is transmitted to the pulley 26. Usually this pulley 26 is secured to the shaft 36 of the bevel-wheel 25, and when the nut 23 has reached the limit of its upward movement on the quadrant-screw the attendant must throw the belt from the pulley 26, in order to prevent any further operation of the screw-shaft and nut. I render this operation unnecessary by providing the screw-operating gearing with a clutch, which is actuated by a toe on the nut 23, so that when the device has been properly set by the spinner before starting the mule the screw-operating gear will be thrown out of action at the proper time without attention on his part.

The pulley 26 is loose on the bevel-wheel shaft 36 and is held in position longitudinally thereon by a collar 305, Fig. 7, the pulley having a sleeve with teeth adapted to engage with those of a sliding clutch-sleeve 37, which turns with but can slide on the shaft 36, and is controlled by a fork 38 on a rod 39, which is free to slide in bearings on the quadrant. This rod has a sleeve 40, a pin 41, on which is adapted to an opening in an arm 42, secured to a rod 43, which is carried by brackets on the quadrant-arm 21, and has adjustable collars 44, each of which is provided with a beveled arm 45, one of said arms being in range of a toe 46 on the nut 23 and the other in range of a toe 47 on the same. When the nut 23 is lowered, so that its toe 46 strikes the arm 45 of the lower collar 44, it causes the shaft 43 to rock, and the arm 42 of the shaft moves the rod 39, so that the teeth of the clutch-sleeve 37 are caused to engage with those of the pulley 26, and thus lock the latter to the screw-operating shaft 36, as shown in Fig. 7. When the nut 23 reaches the limit of its upward movement, however, the toe 47 strikes the arm 45 of the upper collar 44 and imparts such movement to the shaft 43 and its arm 42 as to withdraw the clutch-sleeve 37 from engagement with the clutch of the pulley 26, thus throwing the screw-operating shaft 36 out of gear with said pulley.

The sleeve 40 is loose on the rod 39, but has a bearing upon a collar 48 thereon, a spring 49 being interposed between said sleeve and another collar 48 on the rod, so that when the teeth of the pulley 26 and those of the clutch 37 are not in proper position for engagement with each other the movement of the sleeve 40, necessary to throw the clutch-sleeve 37 in gear, will serve to compress the spring 49, which will operate the clutch when the teeth assume the proper position.

The collars 44 are adjustable on the rod 43, said collars being free to slide on the rod, but being secured in position after adjustment by set-screws 44ª, as shown in Fig. 7, so that any desired extent of movement of the nut 23 upon the screw 22 may be permitted.

Adapted to bearings in a frame 50 is a screw-shaft 51, which is adapted to a nut 52 on a cam 53, the inclined face of which serves as a support for a pin 54 on the builder-rail 55. (See Fig. 3 and dotted lines, Fig. 8.) The movement of this shaft is derived from that of the quadrant, and usually a number of separate shafts, having screw-threads of different pitch, are necessary if any material variation in the fineness of the yarn to be produced is required. In order to avoid the necessity of using different screw-shafts for the purpose, I impart a differential movement to the shaft by devices shown in Figs. 7, 8, 14, and 15. The shaft has a ratchet-wheel 56, and to the shaft adjacent to this wheel is loosely hung an arm 57, to which is pivoted a weighted pawl 58, adapted to the teeth of the ratchet-wheel. Another pawl 59, similarly weighted, is likewise adapted to the teeth of the wheel and is hung to an arm 60, which is free to turn on the shaft and has a segmental rack 61 engaging with a similar rack 62 on an arm 63, the latter being hung to a fixed pivot 64, adjacent to the shaft 51, and the arm 63 being connected to the arm 57 by means of a thumb-nut 65 and bolt 66, this bolt being adapted to a slot 67 in the arm 63 and having a head adapted to an under-cut groove 68 in the arm 57, so that it is adjustable radially. The bolt 66 has a shoulder 66ª, so that it may be confined to the arm 63 by the nut 65, as shown in Fig. 15ª, the under-cut head of the bolt, which enters the groove 68 in the arm 57, being free to move radially in said groove, owing to the different centers of vibration of the arms 63 and 57. The outer end of the arm 57 is connected to a rod 69, the upper end of which is hung to a block 70, pivoted to a pin 71, adapted to a slot 72 in one arm of a lever 73, hung to a fixed stud 74 on the frame 1 of the mule, the other arm of said lever being slotted for the reception of a pin 75, connected by an arm 76 to a pin 77 on the quadrant 14, so that, as the latter is vibrated, a vibrating movement will be imparted to the lever 73 and through the rod 69 to the arm 57. The pin 71, to which the block 70 is hung, is at right angles to the joint between said block and the rod 69, so as to permit the desired universal swing of said rod 69. As the arm 57 is moved in one direction, a movement in the opposite direction is imparted to the arm 60, owing to the connection between the said arm and the arm 63, this connection being preferably such that the extent of movement of the arm 60 is more or less than that of the arm 57. For instance, it may be only half as much, or it may be twice as much. In either case the mechanism shown provides for imparting three different movements to the screw-shaft 51. Thus, if the pawl 59 is thrown out of gear with the ratchet-wheel 56 and the pawl 58 left in gear therewith the movement imparted to said wheel will be an intermittent one, due to the movement of the arm 57, while if the pawl 58 is thrown out of gear and the pawl 59 thrown in gear the movement of the ratchet-wheel will be an intermittent one, due to the vibration of the arm 60, which movement may be greater or less than that imparted directly from the arm 57, depending upon the proportioning of the racks 61 62, while if both pawls are allowed to remain in gear with the ratchet-wheel the movement of the latter will be a continuous one, equal to the sum of the movements imparted by both arms 57 and 60. Slipping of the ratchet-wheel to any material extent is prevented when both pawls are in gear with the same, owing to the fact that one pawl catches it on the forward movement almost as soon as the other releases it on the backward movement. The pawls are preferably so set that when one engages with a tooth of the ratchet-wheel the other will lap a tooth about half way, whereby lost movement to the extent of more than half a tooth is impossible.

In order to provide for a delicate adjustment of the pawls in respect to each other, the arm 63 is inclined in respect to the arm 57, so that by shifting the bolt 66 in the longitudinal slots of the two arms the latter may be caused to turn slightly on their axes and the arm 60 thus moved toward or from the arm 57.

The operating-arm may, if desired, be actuated independently of the quadrant. For instance, the rod 69 may be connected to an arm 73, acted on by a spring and by a cam on the carriage, as shown in Fig. 16.

Before describing that portion of my invention which relates to the take-up for the backing-off chain it will be necessary to refer to Figs. 3, 4, 5, and 11 and to give a brief description of the usual devices for causing the "backing-off motion," this term being applied to a slight backward movement of the spindles after the spinning operation has been completed, so as to unwind the few spare turns of the yarn from the cops or bobbins preparatory to the winding up of the spun threads as the carriage moves inward.

During the spinning operation one of the driving-belts from the counter-shaft above the mule was held by the belt-shifter 78 on the fast-speed pulley 79, the latter being secured to one end of a sleeve 275, the other end of which carries the fast-speed driving-pulley 80 for the reception of the spindle-driving band 81. This band, as shown in Fig. 3, passes round carriers 82 on the fixed frame and carriage, round a pulley 83 on the cylinder-shaft 84 of said carriage, and round a slow-speed pulley 85, which is secured to the end of a shaft 86, said shaft having a slow-speed belt-pulley 87, between which and the fast-speed belt-pulley 79 is the loose pulley 88. A wheel 92 turns loosely on a shaft 224, adapted to bearings on the head of the mule, and this wheel is connected to one-half of a clutch 223, the other half of which is splined on said shaft 224, which is driven from the shaft 86 by means of a worm 89, worm-wheel 90, and spur-gears 91. When the shaft 86 is being rotated by the slow-speed pulley 87, the two parts of the clutch are in engagement and the wheel 92 winds up a weighted chain 225, the motion of the parts being arrested when the driving-belt is shifted from the slow-speed pulley 87 to the fast-speed pulley 79. At a certain time in the operation of the mule, however, the clutch 223 is released by mechanism hereinafter described, and the wheel 92 is then turned backward by means of the weighted chain until a roller 95 on an arm 94 on the wheel 92 strikes an inclined lug 96 on one arm of a lever 97, thereby operating the same, so as to release a lug 98 on the belt-shifter 78 from the control of a notched toe 99 on the other arm of the lever. As soon as the belt-shifter is released its weighted arm 100 causes it to shift the belt from the fast-speed pulley 79 onto the loose pulley 88, under the control of a device described hereinafter, acting upon an arm 101 of the shifter. Secured to the belt-shifter is a lever 102, one arm of which has a hook 103, Figs. 4 and 17, which engages with a pin 104 on a lever 105, the short arm of which actuates a clutch 106, engaging with a clutch face on the inside of the pulley 79, and having a spur-wheel 107 gearing into a pinion 108 on a shaft 109, this shaft having a belt-pulley 110 and being driven continuously from the counter-shaft above the mule. The clutch 106 is thus turned in the contrary direction from the shaft 86, and as soon as the arm 102 has moved to such an extent as to release from its control the pin on the lever 105 the long arm of the latter is acted upon by a spring 111, the tendency of which is to throw the clutch into engagement with the pulley 79, and thus impart to the latter, to the band-pulley 80, and to the cylinder-shaft 84 of the carriage a backward movement sufficient in extent to effect the proper backing off of the threads upon the cops, the clutch being thrown out of gear, as described hereinafter, as soon as the backing-off operation is completed.

On the shaft 84 is a ratchet-wheel 112, and to the teeth of this wheel is adapted a pawl 113, hung to a disk 114 on a scroll-drum 115, loose on the shaft 84. To this drum is connected one end of the backing-off chain 116, this chain passing around a roller 117 at the end of a rod 118, connected to a lug on the faller-leg 119, the chain also passing around a roller 120, which is adjustable in a slot 121 in an arm 122, loose on the inside faller-shaft 35, the hub of said arm having a set-screw 300, which is adapted to engage with a lug 301 on the hub of another arm 123, secured to the inside faller-shaft and connected to the faller-leg. (See Fig. 6.) The opposite end of the chain 116 is connected to any desired fixed point on the carriage. As shown, it is connected to the hub 124 of a lever 125 hung to a stud on the frame 2 of the carriage, one arm of this lever being connected to the rod 118 and having a projection adapted to act upon a toe 126 on a sliding bolt 127, which serves as a locking-bolt for a lever forming part of the winding-gear, as described hereafter, the other arm of the lever carrying a roller 128, which acts upon a lever 129, hung to a pin on the fixed frame and connected by a rod 130 to a lever 131, which serves as a lock for a lever 132, controlling the clutch which governs the operation of the pulling-in scroll.

The parts last described are illustrated most fully in Fig. 28.

The lower end of the faller-leg has a block 133 with a projecting arm 134, said block before the winding up of the chain 116, having a bearing upon an antifriction-roller 135 on a bracket 136, secured to or forming part of an arm 137, hung beneath the frame 2, said bracket having another roller 138, which runs upon the top of builder-rail 55, as shown in Figs. 3 and 6.

The arm 122 is acted upon by a spring 139, which tends to elevate the same, and the lever 125 is acted upon by a spring 140, the tendency of which is to draw forward one arm of said lever and also the connecting-rod 118 and faller-leg, the arm carrying the roller 128 being at the same time depressed.

To the shaft 84 is snugly fitted a bowed spring 141, one arm of which is adapted to a notch in an arm 142, carried by the pawl 113. As long as the cylinder-shaft 84 is turning forward or in the direction of the arrow d, Fig. 6, as it does during the spinning operation, the tendency of the spring 141 is to elevate the pawl 113 and hold it free from the teeth of the ratchet-wheel 112, the disk 114 and winding-drum 115 being prevented from rotating by a check-chain 285, but as soon as the motion of the cylinder-shaft is reversed the spring throws the pawl into engagement with the ratchet-wheel 112. Hence the disk 114 and the chain-drum 115 are caused to rotate so as to unwind the check-chain 285 and wind up the backing-off chain 116, thereby depressing the arm 122, elevating the arm 123 and the faller-leg 119, and partially rotating the inside or winding faller-shaft 35. This movement continues until the block 133 of said faller-leg is free from the control of the roller 135, whereupon the faller-leg is drawn inward by the action of the spring 140 upon the lever 125. The projection of said lever thereupon strikes the toe 126 of the locking-bolt 127, and said locking-bolt is moved forward, so as to release the lever controlling the winding-gear, as described hereinafter and at the same time the roller 128 strikes the lever 129 and throws the pulling-in gearing into action. As the winding-spindle rotates during the inward movement of the carriage the backing-off chain is unwound and the arm 122 rises under the influence of the spring 139. When the carriage reaches the limit of its inward movement the arm 134 of the faller-leg is struck by a fixed stop 375 on the guide for the inner cam of the builder-rail, (see Fig. 3,) and said faller-leg is thrust outward to such an extent that its block 133 will again drop, so as to be retained by the roller 135 of the bracket 136, the set-screw 300 of the arm 122 having by the rise of the arm been moved so far from the lug 301 of the arm 123 as to permit this drop.

With the exception of the release of the winding-gear, as specified, the backing-off operation, as described, is substantially similar to that of an ordinary mule, the novel feature of this portion of my invention being the connection of one end of the backing-off chain to a fixed point and passing said chain around a roller or other bearing 120 on the arm 122, for by this means the length of backing-off chain taken up or given out is double that of the movement of the bearing 120, so that an easy downward movement of the arm is insured and the formation of slack chain is prevented, the chain being taken up as fast as unwound from the drum 115. The slotting of the arm 122 and the adjustment of the roller-bearing for the chain thereon are also features which I believe to be novel and which serve to render the operation of this part of the mule more effective than usual. The winding-gear is shown in Figs. 9 and 10 and in Figs. 18 to 26, to which reference should be made for a proper understanding of the description immediately following. As the carriage moves inward the necessary movement of the shaft 84 for winding the spun threads upon the cops or bobbins is effected by the rotation of the drum 143, which has a spur-wheel 144 gearing into a pinion 145, loose on the shaft, but connected to a disk 146, which carries pawls 147, gearing into a ratchet-wheel 148, fast on said shaft 84, the rotation of the drum being due to the unwinding therefrom of the chain 149, the end of which is connected to the nut 23, carried by the screw 22 of the quadrant-arm. The pawls 147 are acted upon by a spring 150, the tendency of which is to draw said pawls inward or into engagement with the teeth of the ratchet-wheel 148; but, except during the time that the carriage is moving inward and the cylinder-shaft is being rotated by the gearing as described, said pawls are held out of engagement with the ratchet-wheel by the action of a cone-sleeve 151 upon studs 152, carried by the lugs 153, secured to or forming part of said pawls. (See Fig. 18.) The cone-sleeve 151 is under the influence of the forked arm of a lever 154, which is loosely hung to a rock-shaft 155, and to the outer end of the latter is secured a lever 156, one arm of which is, when the carriage is out, retained in the depressed position shown in Fig. 10, by the bent end of the locking-bolt 127; but when this locking-bolt has been moved forward on the completion of the backing-off operation, as above described, the lever 156 is released from the control of the same and the rock-shaft 155 is allowed to vibrate slightly under the influence of a spring 157, connected at one end to a fixed stud on the frame of the carriage and at the other end to one arm of a lever 158, which is hung to a block 159, carried by an arm 160, secured to said rock-shaft, a finger on said arm having a set-screw 161, which bears upon a lug 162, projecting from the hub of the lever 154, the lower arm of said lever having a pin 163, on which bears the lower arm of the lever 158, and tends to maintain the lug 162 in contact with the set-screw 161, whereby on the vibration of the rock-shaft the lever 154 will be moved so as to withdraw the cone-sleeve and permit the pawls 147 to enter into engagement with the teeth of the ratchet-wheel 148. When the carriage has reached the limit of its inward movement, however, and the faller-leg is thrust outward, a spring 276 acts upon the locking-bolt 127 and moves the same outward, so that its bent end engages with and locks the arm of the lever 156, which has been again depressed, owing to the action of a cam 277, Fig. 11, upon the other arm of said lever. The cone-sleeve 151 is thereby caused to act upon the studs 152 of the pawls 147 and lift said pawls out of engagement with the teeth of the ratchet-wheel. It may happen, however, that there is such a strain upon the wheel that the pawls cannot be readily lifted out of engagement with the teeth of the same, and it is with the object of preventing the breakage of the parts in such case that I adopt the peculiar construction of device for operating the cone-sleeve shown in Figs. 19, 20, and 21. It will be observed that the spring 157 is connected to one arm of the lever 158, and that the other arm of the same is adapted to bear upon the pin 163 on the lower arm of the lever 154.

When the lever 156 is depressed for retention by the locking-bolt, as above described, the shaft 155 is caused to rock and there is a movement of the arm 160 to the position shown in Fig. 21. One arm of the lever 158 is thereby caused to press against the pin 163 of the lever 154, and as the other arm of said lever 158 is under the influence of the spring 157 there will, if there is no obstacle to the movement of the cone-sleeve, be a movement of the lever 154 equivalent to that of the arm 160; but if the movement of the cone-sleeve is obstructed the pin 163 becomes a fixed point of bearing for the lever 158, and the latter is simply moved so as to stretch the spring 157, as in Fig. 21, and as soon as the winding-shaft commences to turn forward under the influence of the driving-belt 81 the pawls will be released from strain and the cone-sleeve will be moved inward under the influence of the spring acting on the lever 154 through the medium of the lever 158. When the parts are in the position shown in Fig. 20, the spring acts to lock the lever 154 to the arm 160 and to move both in the direction of the arrow $f$, so as to retract the cone-sleeve. It will thus be observed that by this arrangement the same spring 157 serves to move the cone-sleeve in both directions. If this feature is not desired, two springs may be used, as shown in Fig. 22, for instance, one spring acting on the lever 156 and the other being interposed between a cone-operating arm 154 and the head of a rod 165, passing through the arm and connected to a third arm of said lever 156, the latter acting on the arm 154 in one direction positively and in the other direction through the medium of the spring.

The central portion of the cylinder-shaft 84, which carries the winding-gear, is adapted to bearings 164 on the frame of the carriage and is independent of the cylinder 278 and of the portion of the shaft carrying the cylinder 279, said cylinders being within the boxes of the carriage and receiving the belts for driving the spindles.

In order to provide for the rigid connection of the central or winding portion of the cylinder-shaft to the cylinders and yet permit the ready disconnection of the same, I employ at one end of the shaft a coupling 166, made in two parts and having a key-seat for the reception of a key or feather adapted to grooves in both the central portion of the shaft and in the portion connected to the cylinder 279, (see Fig. 23,) one portion of the coupling having a disk 167, which is bolted directly to the face of the driving-pulley 83, as shown in Figs. 9 and 10. The other end of the central section of the cylinder-shaft may be connected by a similar coupling to the shaft of the opposite cylinder 278; but I prefer to provide this end of the shaft with a key which is adapted to a key-seat in the two-part hub 168 of a flanged disk 169, forming the head of the cylinder 278. (See Fig. 24.) The hub only, however, is halved, as shown in Figs. 24 and 25, the body and rim of the disk being continuous, so that the cylinder need not be detached from the head in order to release it from the central portion of the shaft 84.

Owing to the wear upon the studs 152, which are carried by the pawls 147, it is advisable to provide for bringing different portions of these studs into position for being acted upon by the cone-sleeve 151. I therefore make the studs with stems 170 of square or other polygonal form, adapted to openings 171 of like shape in the lugs 153 of the pawls, as shown in Figs. 18 and 26, so that each stud may be adjusted circumferentially to bring different portions of the head of the same into the path of the cone-sleeve, and to provide for longitudinal adjustment I insert washers 172 between the head of the stud and the under side of the lug 153 and also between said lug and the nut 173 upon the threaded upper end of the stem 170, so that by properly arranging these washers the stud may be made to project more or less below the lug 153, as the condition of the head of the stud, due to wear of the same, may suggest. In the disk 146 are a series of openings 174 for the reception of the butts of the pins 280, to which the pawls 147 are pivoted, these openings being at different distances from the center of the disk, as shown in Fig. 27. When the pawls are new, the pivot-pins of the same are adapted to the openings farthest from the center of the disk; but as the pawls wear, the pins may be adjusted to openings nearer the center of the disk, so as to render the pawls effective until they are completely worn out. The disk has also a series of stops 175, whereby the pawls are prevented from swinging outward to an undue extent under centrifugal action.

The main feature of novelty in my improved winding-gear is that it is controlled by the backing-off gear and is thrown into action before the pulling-in gearing commences to move the carriage inward, so that the disk 146 has no movement when the pawls 147 drop into engagement with the ratchet-wheel 148, the stripping of the teeth of the latter or the breaking of the pawls being thereby prevented. I thus overcome an objection to mules which are so constructed that the throwing of the pawls into gear with the ratchet-wheel of the winding-gear is due to the first part of the inward movement of the carriage.

As before remarked, the movement of the belt-shifter in shifting the belt from the fast-speed pulley 79 to the loose pulley 88 is regulated in order to prevent too sudden a movement of the belt when said belt-shifter is released from the control of the notched toe 99 on the releasing-lever 97 after the completion of the spinning operation. This regulating device consists of a worm-wheel 176, free to turn on a fixed pin 180 and driven by a worm 177 on a shaft 178, which receives movement from the shaft 109 through the medium of spur-wheels 179, so that a continuous movement at a slow speed in the direction of the arrow $g$, Fig. 4, is imparted to said worm-wheel. Secured to or forming part of the worm-wheel is a ratchet-wheel 181, to the teeth of which are adapted pawls 182, carried by one arm 184 of a lever 183 loosely hung to the pin 180, this lever having two other arms 185 and 186. The arm 185 has a weight 187, upon which acts the arm 101 connected to the belt-shifter, and the movement of the lever 183 in the direction of the arrow thereon, Fig. 4, is limited by a stop 188 projecting from but adjustable on the fixed pin 180. When the belt is on the pulley 79 the arm 101 is depressed, and the arm 185 of the lever 183 drops to an extent permitted by the contact of the arm 186 with the stop 188, as shown in Fig. 29, the weight tending to maintain the lever in this position. As soon as the belt-shifter is released from the control of the lever 97, however, the arm 101 rises and comes into contact with the weight 187, thus tending to move the lever 183 forward in the same direction as the ratchet-wheel 181. As the speed of the latter is limited, however, by that of the worm-wheel 176, the lever necessarily partakes of this slow movement, thereby serving to limit the rise of the arm 101 and regulate the speed at which the belt is shifted from one pulley to the other. If desired, the first part of the movement may be rapid and the latter part only restricted, this being accomplished by so adjusting the stop 188 that there will be more or less free movement of the arm 101 before it strikes the weight 187. This regulating device for the belt-shifter may be varied in various ways without departing from my invention. For instance, the retarder 183 may be a single arm instead of a lever, if desired, and the movement of the wheel 181 may be restricted by an escapement-wheel and escapement-lever similar to those of a clock, as shown in Fig. 30. Hence my main claims on this feature of the invention are not limited to any special form of retarder or to any specific means for regulating the movement of said wheel 181.

As described in a former part of the specification, part of the mechanism connected with the backing-off chain has the effect of throwing the pulling-in gearing into action at the conclusion of the backing-off operation, this being effected by the operation of a lever 131, a toe 190 on which had previously acted as a lock for one arm 191 of a lever 132, another arm 193 of which controlled a cup 194 sliding on the vertical shaft 195, which is driven continuously by bevel-gears 196 from the shaft 109. The cup 194 is under control of a notched arm 192 keyed to the shaft 195, so that said cup is compelled to rotate with the shaft. (See Figs. 4, 31, and 32.) When the lever 132 is released, an arm 197 of the same is acted upon by springs 198 and 111, which serve to depress the cup onto a disk 199, carrying a bevel-pinion 200, which gears into a bevel-wheel 201 on the shaft 10, carrying the pulling-in scroll 6 and check-scroll 11. (See Fig. 4.) The arm 197 is connected to the arm 105 of the backing-off clutch 106 by a rod 307, Figs. 4 and 28, so that the above-described movement of the lever served to throw said clutch out of gear and stopped the backing-off operation. When the inward movement of the carriage is almost completed a roller 202 thereon (see Fig. 9) acts upon a lever 203, connected to a rod 204, Fig. 33, which is also connected to a lever 205, and the latter is thereupon withdrawn from beneath a pin 303, which is free to slide vertically in a disk 206, and carries above said disk a supporting-plate 304 for a cup 207, which is secured to a sleeve keyed to the shaft 195, as shown in Fig. 31. On the withdrawal of the lever 205, therefore, the cup is pressed into contact with the disk 206 by the spring 306, and said disk is rotated with the cup. The disk 206 is secured to a sleeve 305, which also carries a bevel-pinion 208, Fig. 31, the latter gearing into a bevel-wheel 209, secured to or forming part of a sleeve 210, which is secured to one end of a cam-shaft 211. (See Figs. 34 and 35.) One revolution of the disk 206 and its sleeve 305 and bevel-pinion 208 causes a half-revolution of the shaft 211, and after the disk 206 has made one revolution it is stopped by the lever 205, which has meantime been restored to its original position, so that the pin 303 rises up the inclined end of the lever, operates the clutch-supporting plate 304, and causes the separation of the cup 207 from the disk 206, the forward movement of the disk and its pin 303 being arrested as said pin runs up the inclined end of the lever 205 and comes in contact with the lug 308 on the lever. (See Figs. 4 and 34.)

The sleeve 210 has cams 212, 213, and 214, and the cam-shaft has cams 215 and 216. During the half-revolution of the shaft 211 and sleeve 210 the cams thereon have effected various movements of the mechanism carried by the head of the mule. For instance, the cam 214 acted upon the sleeve 217 of a rod 218, connected to the lever 105 of the backing-off clutch, so as to hold the same out of gear with the pulley 79, the clutch having been thrown out of gear at the conclusion of the backing-off operation, owing to the connection of the lever 105 with the arm 197 of the lever 132, as before described. The cam 215 threw into gear the clutch 219, Fig. 4, for operating the draft-scroll on shaft 7. The cam 212 acted upon the lever 102 so as to operate the belt-shifter 78 and transfer the belt from the loose pulley 88 to the slow-speed driving-pulley 87, and the cam 213 acted upon an antifriction-roller carried by the arm 197 of the lever 132 so as to lift the cup 194 from the disk 199 and throw the pulling-in scrolls out of gear. Said cam 213 also acted upon a lever 220, an inclined head 221, on which struck one arm of a lever 222, Fig. 28, and caused the same to actuate the clutch 223, whereby the dial 92, which regulates the spinning, was thrown out of gear with the operating-shaft 224. During the operation of the dial by the shaft a chain 225, having a weight 226, was being wound upon a pulley on the dial, and as soon as the latter is released from the control of the shaft 224 the weight causes the chain to unwind, so as to restore the dial to its normal position. All of these parts are constructed in a manner similar to that adopted in mules heretofore made, and are only described with the view of giving a general understanding of the operation of this portion of the mule, the only feature of novelty in which is a device which I have added for the purpose of relieving the friction-clutch which operates the cam-shaft 211 and sleeve 210 from a portion of the strain to which it is ordinarily subjected. This device consists of a lever 227, which is hung to a bearing on the frame of the mule, one arm of the lever being connected to one end of the spring 198 and having a bearing upon a lug 228 on the arm 197 of the lever 132 at all times except when the carriage is at the limit of its inward movement. At such times a projecting bar 229 on the carriage of the mule strikes a rounded toe 230 on the other arm of the lever 227 and causes such an operation of the lever as withdraws it from contact with the lug 228 on the lever 132, the latter being thereby relieved from the pressure of the spring 198, so that when the cam 213 acts upon the lever to lift the cup 194 it has only the weight of the cup and pressure of the spring 111 to overcome. As the carriage moves out, however, the lower arm of the lever 227 is released from the control of the bar 229 and the other arm of the lever again bears upon the lug 228, so as to subject the lever 132 to the action of the spring 198 and insure the proper contact of the cup 194 with the disk 199 when it becomes necessary to again throw the pulling-in scrolls into gear.

In order that the attendant may stop the carriage at any point in its inward movement, a lever 231 is adapted to act upon the end of the arm 193 of the lever 132, this lever 231 being under control of rods 232, which are connected to trip levers or handles at the front of the frame. When the carriage reaches the limit of its outward movement a roller 233 on the same strikes a lever 234 connected to the rod 204 and thereby moves the lever 205, so as to again operate the clutch-cup 207 and cause a further half-revolution of the sleeve 210 and cam-shaft 211, the effect of which is to throw the draft-scroll out of operation, to shift the belt from the slow-speed pulley 87 onto the high-speed pulley 79, and to operate the lever 220, so as to release the lever 222 and permit a spring 308 to actuate the same and the clutch 223 of the dial 92, which controls the spinning, the cam 214 being brought into such position as to permit the proper operation of the lever 105, controlling the backing-off clutch, when the time for the operation of such lever arrives. The cam 215, which operates the clutch on the draft-scroll on shaft 7, acts through the medium of devices shown in Figs. 38, 39, 40, and 41. When throwing the clutch out of gear, the cam strikes an arm 235, pivoted at its upper end to a stud 236 on the frame, and having an opening 237 for the reception of the stem of the clutch-fork.

Pivoted to the arm 235 at the point 238 is an arm 239, which is connected to the arm 235 by a spring 240, so that, while the outward movement of the clutch is a positive one, the inward movement is effected through the medium of the spring and the parts are at liberty to yield until the teeth of the two parts of the clutch are in proper position for engagement with each other. Pivoted to the lower end of the arm 239 is a hooked catch 241 having a toe 242. When the clutch is open the parts are in the position shown in Fig. 38, and the toe of the catch is acted upon by a pin 243 on an arm 244 of the frame, so that the hooked end of the catch is free from engagement with the clutch-operating arm 235 and the movement of the arm 239 independently thereof is permitted; but when the clutch is in gear the toe of the catch is free from the influence of the pin 243 and said catch engages with and locks the lower end of the arm 235, so as to hold the clutch in gear and prevent accidental release of the same, (see Fig. 39,) this movement of the catch being due to the action of a spring 310, coiled around the hub of the same. (See Fig. 40.)

To suitable bearings on the fixed frame 1 of the mule is adapted a shaft 245, which extends the entire length of the mule and is known as a "slubbing-roll," its duty being to provide for such an operation of the feed-rolls that the proper amount of slubbing or roving will be fed forward during the outward movement of the carriage. When the carriage has reached the limit of its inward movement and the cam-shaft 211 has had a half-revolution imparted to it, as before described, the cam 216 on said shaft acts upon one arm of a lever 246, another arm of which controls the sliding half 247 of a clutch, the other half 248 of which is secured to or forms part of a sleeve 249, loose on the shaft 245 and driven by spur-gears 400, 401, 402, and 403 from the shaft 86, the wheel 402 being also geared by wheels 404, 405, and 406 to the shaft 7. The sliding half 247 of the clutch is splined to the shaft 245, and when moved into engagement with the rotating half 248 of the clutch by the spring 407 is held in this position by the engagement of the long arm of a catch-lever 251 with a stud 252 on the lever 246. Splined to the shaft 245 is another sleeve 253, which has teeth adapted to engage with teeth at one end of a pinion-sleeve 254 loose on the shaft 245 and gearing into a spur-wheel 255, the hub of which is threaded internally and constitutes a nut adapted to a threaded shaft 256 projecting from the frame of the mule. When the parts are in the position shown in Fig. 5, the clutch-sleeve 253 is caused to engage with the pinion-sleeve by a spring 408; but as the spur-wheel 255 moves outward on the shaft 256—that is to say, to the right in Fig. 5—a pin 258 carried by said spur-wheel acts upon a toe 259 on the short arm of the lever 251 and depresses the same so as to release the lever 246, the latter being retracted under the influence of a spring 260, so as to withdraw the clutch-sleeve 247 from engagement with the sleeve 248, and thus stop the rotation of the shaft 245. An inclined lug 281 on an arm 269 of the lever 246 at the same time strikes a lever 257, Fig. 42, and withdraws the clutch 253 from engagement with the pinion-sleeve 254. These devices are common to mules as now constructed; but it is the usual practice to effect the retraction of the spur-wheel 255 on the screw-shaft 256 by the action of a weighted cord or chain connected to said wheel, the result being that when the wheel reaches the limit of its inward movement it has acquired such momentum as to frequently cause the stripping of its teeth or those of the pinion. In order to overcome this objection I retract the wheel 255 by a positive movement. The end of the pinion-sleeve 254 opposite that with which the clutch 253 engages is also toothed and adapted to engage with a clutch 261 which is carried by a pulley 262, the latter being driven continuously by a belt 263, from a pulley 264, on the shaft 109, and being controlled by a lever 265, acted on by a spring 266, and having a set-screw 267, for the action of a lug 268, on the rear side of the spur-wheel 255. When the clutch 247 is in gear and motion is being imparted to the shaft 245 the clutch 261 is held out of gear by the engagement of the arm 269 of the lever 246 with the lever 265, as shown in Fig. 5. As the lever 246 is moved, however, so as to throw the clutch 247 out of gear, the arm 269 is depressed, so as to release the lever 265 and permit the clutch 261 to be thrown into gear, owing to the action of the spring 266 on the lever 265. A reverse movement is thus imparted to the pinion 254 and the spur-wheel 255, and the latter is caused to move inward on the screw-shaft 256, or to the left in Fig. 5, this movement continuing until the lug 268 strikes the set-screw 267 of the lever 265 and moves the latter rearward, so as to throw the clutch 261 out of gear, the arm 269 of the lever 246 being in position to retain the lever 265 before the spur-wheel 255 again moves forward.

I claim as my invention—

1. The combination of the quadrant arm and its screw, the screw operating shaft, the clutch, a clutch operating rod mounted so as to be free to turn in bearings on the quadrant arm and having two beveled arms, one projecting in one direction and the other in the opposite direction from the rod, and a nut on the quadrant screw having oppositely projecting lugs for acting on said arms, substantially as specified.

2. The combination of the quadrant arm; its screw and nut; the screw operating shaft; the clutch; the rod connected thereto; an operating rod having an arm 42; and a spring through the medium of which said arm acts to throw the clutch into gear; all substantially as specified.

3. The combination of the builder rail screw; the wheel connected thereto; two arms, each carrying a pawl engaging with the wheel, but capable of being disengaged therefrom; gearing between said arms whereby the arms are caused to move in opposite directions; and means for vibrating one of said arms; all substantially as specified.

4. The combination of the builder rail screw and its wheel; the arm 57 having a pawl engaging with said wheel but capable of being disengaged therefrom; the arm 60, having a similar pawl and a segmental rack; and an arm 63 pivoted eccentrically to the arms 57 and 60, but connected to said arm 57, and having a segmental rack engaging with that on the arm 60; all substantially as specified.

5. The combination of the builder rail screw and its wheel; the two arms 57 and 60, and their pawls; the arm 63, inclined in respect to the arm 57, and geared to the arm 60, but pivoted eccentrically in respect thereto; and the connecting bolt adapted to longitudinal slots in said arms 57 and 63; all substantially as specified.

6. The combination of the quadrant; the builder rail screw and its wheel; pawls engaging with said wheel but capable of being disengaged therefrom; an arm for actuating the said pawls; an operating rod connected to said arm; and a lever, one arm of which is connected to the quadrant, and the other arm connected to the said operating rod; all substantially as specified.

7. The combination of the cylinder shaft; the drum for the backing off chain; the faller shaft and its arm 123; the faller leg; the loose arm 122; the spring acting thereon; a backing off chain, passing around a bearing on the arm 122, and connected at one end to the chain drum, and at the other end to a fixed point on the carriage; and a bearing whereby the arm 122 acts on the arm 123 when moving in one direction, but has no influence on said arm when moving in the contrary direction; all substantially as specified.

8. The combination of the cylinder shaft; the drum for the backing off chain; the faller shaft and its arm 123; the faller leg; the arm 122 and its spring; a lever 125 connected to the faller leg; a bearing on said lever and a backing off chain, passing around said bearing on said lever, and around a bearing on the arm 122, and having one end connected to the winding drum, and a fixed connection at the opposite end; all substantially as specified.

9. The combination of the cylinder shaft 84 and gearing, including a ratchet wheel and pawl, whereby said shaft is rotated on the inward movement of the carriage, a pawl-lifting sleeve; its actuating lever and retainer therefor and backing-off mechanism acting upon said retainer, substantially as specified.

10. The combination of the cylinder shaft and gearing, including a ratchet wheel and pawl, whereby said shaft is rotated on the inward movement of the carriage, a pawl-lifting sleeve, the actuating lever therefor; a bolt for retaining said lever; a lever forming part of the backing-off mechanism, and constructed to actuate said locking bolt; and a spring acting upon the bolt when released from the control of said lever; all substantially as and for the purpose specified.

11. The combination of the cylinder shaft and gearing, including a ratchet wheel and pawl, whereby said shaft is rotated on the inward movement of the carriage, a pawl-lifting sleeve, its actuating lever; a cam for operating said lever when the carriage reaches the limit of its inward movement; a retainer for the lever; and backing-off mechanism acting on said retainer; all substantially as specified.

12. The combination of the cylinder shaft and gearing, including a ratchet wheel and pawl, whereby said shaft is rotated on the inward movement of the carriage, the pawl-lifting sleeve; a lever for moving the same; a spring 157; and mechanism whereby said spring is caused to act upon the lever to move it in both directions; all substantially as specified.

13. The combination of the rock shaft 155; the lever 154 thereon; an arm 160, having a bearing on said lever; the lever 158 hung to the arm 160, and having one arm bearing upon the lever 154; and a spring 157 acting upon the other arm; all substantially as specified.

14. The combination of the pawl and its lug 153; the stud carried by said lug; the retaining nut; and washers interposed between one side of the lug and the head of the stud, and between the other side of the lug and the retaining nut; as set forth.

15. The combination of the cylinder shaft and its ratchet wheel; the pawls acting thereon; the pawl carrying disk having a series of openings for the reception of the pivot pins of the pawls, said openings being at different distances from the center of the disk; as set forth.

16. The combination of the cylinders, the central portion of the cylinder shaft, winding gearing carried thereby; a driving pulley on the shaft of one cylinder; a coupling for connecting said pulley to the central portion of the cylinder shaft; a slotted hub carried by the other cylinder, and a key whereby said slotted hub is secured to the end of the central portion of the cylinder shaft, substantially as specified.

17. The combination of the belt shifter, a wheel combined with means for imparting a determinate movement thereto, a ratchet wheel carried by said moving wheel, a pawl engaging with said ratchet wheel, and an arm carrying said pawl and serving as a stop for the belt shifter, all substantially as specified.

18. The combination of the draft clutch 219, and its operating cam 215, with a clutch shifting device, consisting of a rigid arm under control of the cam; a loose arm also under control of the cam; a spring connecting said loose arm to the rigid arm; a clutch; a catch for locking the two arms together; and a pin for operating said catch, as the loose arm swings; all substantially as specified.

19. The combination of the clutch for the pulling in scroll; its actuating lever; a cam for moving said lever in one direction; a spring tending to move it in the opposite direction; a lever connected to said spring, and bearing on the clutch-operating lever, and a projection on the carriage for operating said lever and withdrawing it from contact with the clutch lever, whereby the latter, when acted on by the cam, is relieved from the tension of the spring, all substantially as specified.

20. The combination of the slubbing shaft; the pinion 254; the opposite clutches 253 and 261 therefor; the main clutch 247; and the operating lever therefor having an arm whereby one clutch 253 is thrown out of gear, and the other clutch 261, released so as to be thrown into gear; all substantially as specified.

21. The combination of the slubbing shaft; the pinion 254; the clutch sleeve 261, and means for rotating the same; an operating lever for said clutch; and the traversing wheel 255, having a lug to strike said lever, and throw the clutch out of gear; all substantially as specified.

22. The combination of the slubbing shaft; the pinion 254; the clutch 261 and means for rotating the same; the operating lever 265 therefor; the traversing wheel 255, having a lug for throwing the clutch out of gear; and the main clutch lever 246, having an arm whereby the clutch 261 is held out of gear, after the action of said lug; all substantially as specified.

In testimony whereof I have signed my name to this specification in the presence of two subscribing witnesses.

BENJAMIN F. MEYER.

Witnesses:
WILLIAM F. DAVIS,
HARRY SMITH.